United States Patent
Arosio

(10) Patent No.: US 7,815,169 B2
(45) Date of Patent: Oct. 19, 2010

(54) QUICK COUPLING

(75) Inventor: Massimo Arosio, Treviglio (IT)

(73) Assignee: Faster S.p.A., Rivolta D'Adda (IT)

( * ) Notice: Subject to any disclaimer, the term of this patent is extended or adjusted under 35 U.S.C. 154(b) by 0 days.

(21) Appl. No.: 11/728,417

(22) Filed: Mar. 26, 2007

(65) Prior Publication Data

US 2007/0228313 A1  Oct. 4, 2007

(30) Foreign Application Priority Data

Mar. 29, 2006  (IT)  ................ MI06A0591

(51) Int. Cl.
*F16K 51/00* (2006.01)
(52) U.S. Cl. ............. 251/149.6; 251/149.1; 137/614.04
(58) Field of Classification Search .............. 251/149.1, 251/149.6, 149; 137/614, 614.02–614.05
See application file for complete search history.

(56) References Cited

U.S. PATENT DOCUMENTS

| | | | | |
|---|---|---|---|---|
| 2,670,751 A | * | 3/1954 | Wilson | 137/107 |
| 2,735,696 A | * | 2/1956 | Omon et al. | 137/614.05 |
| 3,052,488 A | * | 9/1962 | Bruning | 285/18 |
| 3,215,161 A | * | 11/1965 | Goodwin et al. | 137/614.04 |
| 4,200,121 A | * | 4/1980 | Walter et al. | 137/614.05 |
| 4,398,561 A | * | 8/1983 | Maldavs | 137/614.05 |
| 4,974,635 A | * | 12/1990 | Hanus et al. | 137/614.05 |
| 5,320,133 A | * | 6/1994 | Nimberger | 137/614.04 |
| 5,937,899 A | * | 8/1999 | Zeiber | 137/614 |
| 6,354,564 B1 | * | 3/2002 | Van Scyoc et al. | 251/149 |
| 6,655,656 B2 | * | 12/2003 | Maldavs | 251/149.6 |
| 6,722,405 B2 | * | 4/2004 | Cessac et al. | 141/301 |
| 6,776,187 B1 | * | 8/2004 | Marquis et al. | 137/614.04 |
| 6,814,340 B2 | * | 11/2004 | Arosio | 251/149.1 |
| 2003/0140971 A1 | * | 7/2003 | Haunhorst | 137/614.04 |

* cited by examiner

*Primary Examiner*—John K Fristoe, Jr.
*Assistant Examiner*—Marina Tietjen
(74) *Attorney, Agent, or Firm*—Kirschstein, et al.

(57) ABSTRACT

A quick coupling, for example of a female type, to be connected with a counterpart, of a male type, comprises, inside a valve body, downstream of an inlet fitting for receiving a pressurized fluid flow (F), a guide and conveying body (7) having a parabolic cross section, and a plurality of radially outwardly extending ribs, delimiting, circumferentially of the guide and conveying body, a plurality of flow channels communicating with an annular chamber (6) closed by a valve body (3).

5 Claims, 2 Drawing Sheets

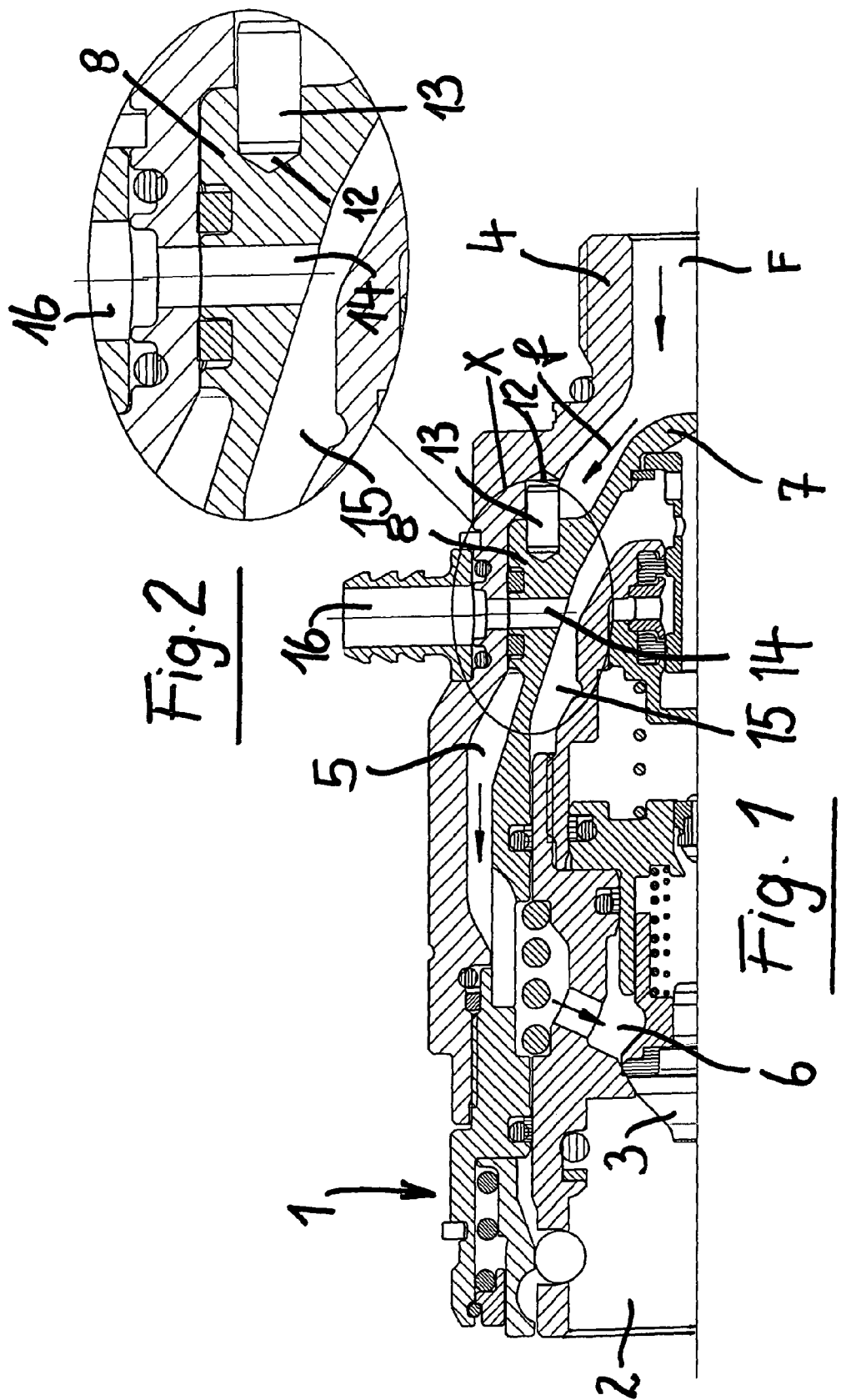

QUICK COUPLING

BACKGROUND OF THE INVENTION

The present invention relates to a quick coupling, for example of a female type, which can be coupled to a male type of counterpart.

As is known, quick coupling users frequently require to greatly increase the oil flow rate while reducing load losses in devices to which the quick couplings are fitted.

Moreover, it has been found as greatly advantageous to reduce the length of the individual components of the quick coupling.

Several attempts have been made in the prior art both to reduce the constructional length of the quick couplings and to obtain improvements, from a hydrodynamic standpoint in the related devices; however, the achieved results have not been found to be very satisfactory.

SUMMARY OF THE INVENTION

Accordingly, the aim of the present invention is to overcome the above mentioned drawbacks of the prior art and provide a quick coupling having a constructional length less than that of prior devices, while improving their hydrodynamic conditions, and allowing to greatly increase the oil flow rate and reduce the load losses.

According to the invention, the above mentioned object is achieved by a quick coupling, for example of a female type, to be connected with a male type counterpart, wherein, inside the valve body, downstream of a pressurized fluid flow inlet fitting, a guide and conveying body having a parabolic cross-section is provided, with a plurality of outward radially directed ribs projecting from said guide and conveying body, said ribs delimiting, in a circumferential direction of said guide and conveying body, a plurality of fluid flow channels joining with an annular chamber closed by a valve body.

BRIEF DESCRIPTION OF THE DRAWINGS

The subject matter according to the present invention will be disclosed and illustrated in a more detailed manner hereinafter with reference to an exemplary embodiment thereof, as shown in the accompanying drawings, where:

FIG. 1 is a cross-sectional view showing a half of a female type of quick coupling according to the invention;

FIG. 2 is a cross-sectional view showing a detail indicated by X in FIG. 1; and

DESCRIPTION OF THE PREFERRED EMBODIMENT

Figure 3:
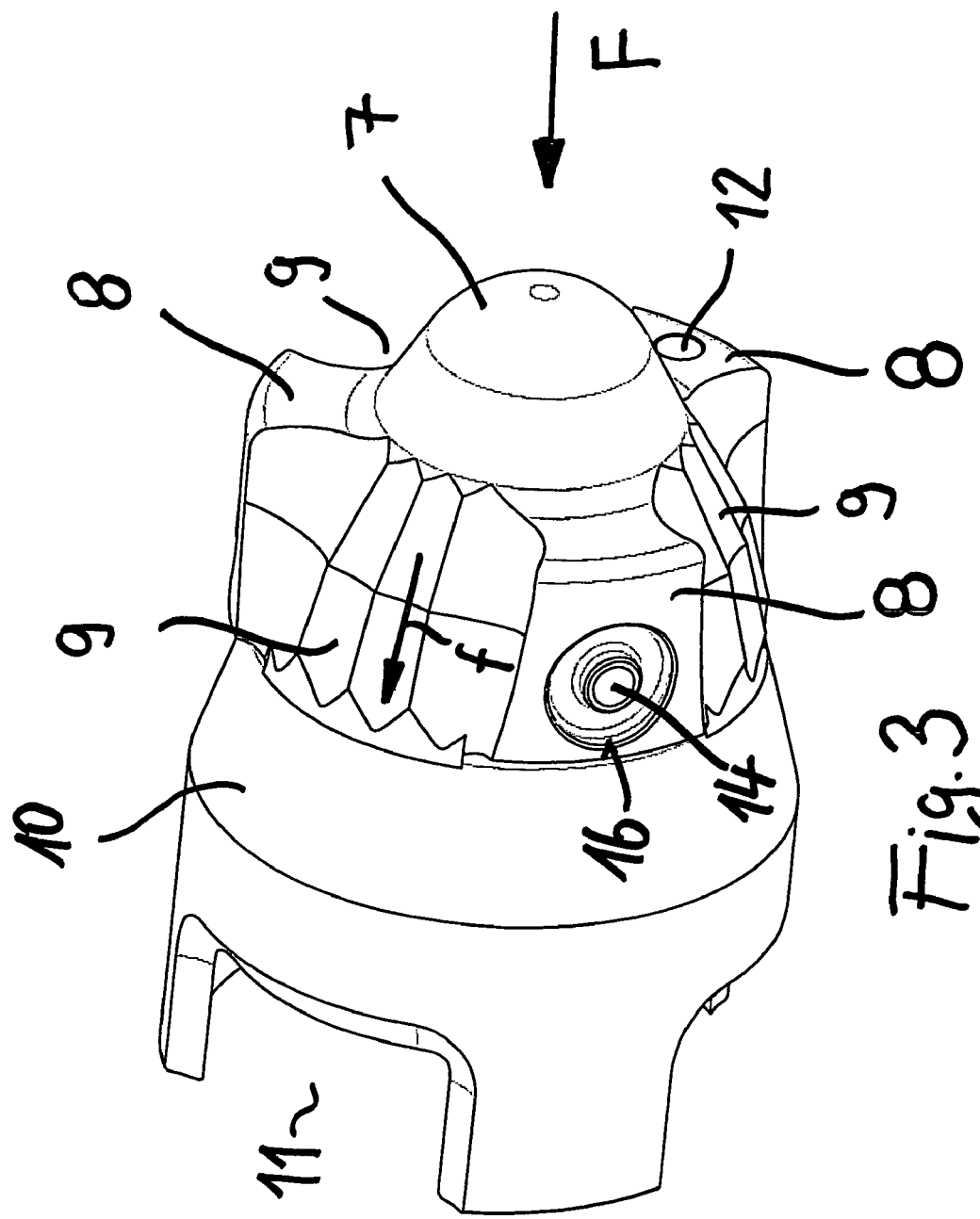
FIG. 3 is a perspective view showing the end conveying body arranged inside the quick coupling.

As shown in FIG. 1, the female type of quick coupling 1, comprises a port 2 for engaging therein a male coupling, not shown.

The port 2 is shut-off or closed by an axially movable valve body 3, of a per se known type.

At a position opposite to the port 2, the quick coupling 1 comprises a fitting 4 to which a duct for supplying a pressurized fluid F, conveyed in the direction shown by the arrows (f), can be connected.

The fluid F is conveyed along a conveying channel 5 with a smooth arch arrangement, formed inside the valve body 1, and ending at an annular chamber 6 shut-off or closed by the valve body 3 toward the male element coupling port 2.

As shown, the channel 4 gradually extends along an arch extension.

Immediately downstream of the fitting 4, the flow F will encounter a guide and conveying body 7, which is shown by a perspective view in FIG. 3.

From FIG. 3 it should be apparent that the fluid F guide and conveying body 7 has a substantially parabolic configuration. More specifically, said body 7 is advantageously provided with radially projecting ribs 8 delimiting fluid flow channels.

Thus, the three ribs 8 which laterally project from the body 7 define three channels 9, allowing, for example, substantially laminar oil flow F.

The oil flow will arrive, after the channels 9, through an annular end inclined surface 10, at the rear portion 11 of the conveying body 7, and hence to the valve body 3 shut-off chamber 6.

To firmly connect the conveying body 7 inside the valve body 1, at least one of the ribs 8 comprises a hole 12 in which a locking pin 13 is engaged (see FIG. 1).

At least one of said ribs further comprises a throughgoing hole 14 formed, for example, through the corresponding rib 8 communicating with a chamber 15, and ending at an outlet fitting 16.

Said outlet fitting, upon assembling the device 1, can be coupled to a resilient small tube ending, for example, with a small collecting tank (not shown); thus, small unpressurized oil amounts, collected in the chamber 15, can be discharged through said throughgoing hole 14.

The invention claimed is:

1. A female-type quick coupling for fluid flow coupling to a male-type quick coupling, the female-type quick coupling comprising:
   an inlet fitting for connection to a pressurized fluid;
   a valve body arranged downstream of the inlet fitting and movable along an axial direction;
   a guide and conveying body having a parabolic cross section and arranged within the valve body;
   a plurality of ribs projecting radially outwardly from the guide and conveying body, the ribs being spaced apart along a circumferential direction; and
   a plurality of fluid flow channels between each circumferentially adjacent pair of the ribs, the fluid flow channels guiding the pressurized fluid that flows along the fluid flow channels as a substantially laminar flow along the axial direction to an annular chamber, the annular chamber being opened and closed by axial movement of the valve body to respectively permit and block the flow of the pressurized fluid to the male-type quick coupling.

2. The quick coupling of claim 1, and an arched inner channel extending from the inlet fitting to the annular chamber.

3. The quick coupling of claim 1, wherein the guide and conveying body has an inclined annular surface at an axial end portion that is in fluid communication with the annular chamber, and wherein the fluid flow channels extend to the inclined annular surface along which the pressurized fluid flows.

4. The quick coupling of claim 1, and a hole through one of the ribs, and a locking pin engaged in the hole for fix the guide and conveying body in position within the valve body.

5. The quick coupling of claim 1, and a collection chamber between the guide and conveying body and the valve body, an outlet fitting, and a throughgoing passage extending from the outlet fitting through one of the ribs to the collection chamber.

* * * * *